(12) United States Patent
Mikhael et al.

(10) Patent No.: US 7,016,885 B1
(45) Date of Patent: Mar. 21, 2006

(54) SELF-DESIGNING INTELLIGENT SIGNAL PROCESSING SYSTEM CAPABLE OF EVOLUTIONAL LEARNING FOR CLASSIFICATION/RECOGNITION OF ONE AND MULTIDIMENSIONAL SIGNALS

(75) Inventors: Wasfy B. Mikhael, Winter Spring, FL (US); Manal M. Abdelwahab, Orlando, FL (US); Venkatesh Krishnan, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 630 days.

(21) Appl. No.: 10/230,425

(22) Filed: Aug. 28, 2002

Related U.S. Application Data

(60) Provisional application No. 60/315,420, filed on Aug. 28, 2001.

(51) Int. Cl.
*G06N 3/02* (2006.01)
*G06T 1/40* (2006.01)

(52) U.S. Cl. .......................... 706/20; 706/15; 382/115; 382/118; 382/156; 382/190

(58) Field of Classification Search ................. 706/20; 382/115, 118, 190, 156; 348/135
See application file for complete search history.

(56) References Cited

U.S. PATENT DOCUMENTS

| | | | |
|---|---|---|---|
| 4,254,399 A | 3/1981 | Burkhardt et al. | 340/146.3 |
| 5,175,775 A | 12/1992 | Iwaki et al. | 382/31 |
| 5,432,906 A | 7/1995 | Newman et al. | 395/162 |
| 5,459,636 A | 10/1995 | Gee et al. | 364/516 |
| 5,497,430 A * | 3/1996 | Sadovnik et al. | 382/156 |
| 5,537,669 A | 7/1996 | Evans et al. | 382/141 |
| 5,550,928 A | 8/1996 | Lu et al. | 382/116 |
| 5,640,468 A | 6/1997 | Hsu | 382/190 |
| 5,680,481 A * | 10/1997 | Prasad et al. | 382/190 |
| 5,696,849 A | 12/1997 | Blackham | 382/260 |
| 5,781,650 A | 7/1998 | Lobo et al. | 382/118 |
| 5,805,721 A | 9/1998 | Vuylsteke et al. | 382/128 |
| 5,835,616 A | 11/1998 | Lobo et al. | 382/118 |
| 5,864,630 A | 1/1999 | Cosatto et al. | 382/103 |
| 6,011,865 A * | 1/2000 | Fujisaki et al. | 382/189 |
| 6,816,611 B1 * | 11/2004 | Hagiwara et al. | 382/165 |
| 2002/0069218 A1 * | 6/2002 | Sull et al. | 707/501.1 |

OTHER PUBLICATIONS

Benediktsson, J.A.; Sveinsson, J.R.; Ersoy, O.K.; Swain, P.H., "Parallel consensual neural networks"; Neural Networks, IEEE Transactions on vol. 8, Issue 1, Jan. 1997 Page(s): 54-64.*

(Continued)

*Primary Examiner*—Anthony Knight
*Assistant Examiner*—Sergey Datskovskiy
(74) *Attorney, Agent, or Firm*—Brian S. Steinberger; Law Offices of Brian S. Steinberger, P.A.

(57) ABSTRACT

A Self-Designing Intelligent Signal Processing System Capable of Evolutional Learning for Classification/Recognition of One and Multidimensional Signals is described which classifies data by an evolutionary learning environment that develops the features and algorithms that are best suited for the recognition problem under consideration. The System adaptively learns what data need to be extracted in order to recognize the given pattern with the least amount of processing. The System decides what features need to be selected for classification and/or recognition to fit a certain structure that leads to the least amount of processing according to the nature of the given data. The System disclosed herein is capable of recognizing an enormously large number of patterns with a high accuracy.

11 Claims, 14 Drawing Sheets

OTHER PUBLICATIONS

Ki-Chung Chung, Seok Cheol Kee and Sang Ryong Kimg. Face Recognition using Principal Component Analysis of Gabor Filter Responses, *1999 IEEE*, pp. 53-57.

Xuling Luo and Gagan Mirchandani, An Integrated Framework for Image Classification, *2000 IEEE*, pp. 620-623.

Jon A. Benediktsson, Philip H. Swain, and Okan K. Ersoy, Neural Network Approaches Versus Statistical Methods in Classification of Multisource Remote Sensing Data, *1990 IEEE, IEEE Transactions on Geoscience and Remote Sensing*, vol. 28, No. 4, Jul. 1990, pp. 540-552.

Tin Kam Ho, Jonathan J. Hull, and Sargur N. Srihari, Decision Combination in Multiple Classifier Systems, *1994 IEEE, IEEE Transactions on Pattern Analysis and Machine Intelligence*, vol. 16, No. 1, Jan. 1994, pp. 66-75.

Paulo Prampero and Andre de Carvalho, Recognition of Vehicles Silhouette Using Combination of Classifiers, *1998 IEEE*, pp. 1723-1726.

Weiyang Zhou, Verification of the Nonparametric Characteristics of Backpropagation Neural Networks for Image Classification, *1999 IEEE*, pp. 771-779.

Yoshihisa Hara, Robert G. Atkins, Simon H. Yueh, Robert T. Shin and J.A. Kong, Application of Neural Networks to Radar Image Classification, *1994 IEEE, IEEE Transactions of Geoscience and Remote Sensing*, vol. 32, No. 1, Jan. 1994, pp. 100-109.

Manish N. Sarlashkar, M. Bodruzzaman, and M.J. Malkani, Feature Extraction Using Wavelet Transform For Neural Network Based Image Classification, *1998 IEEE*, pp. 412-416.

Lei Xu, Adam Krzyzak, and Ching Y. Suen, Methods of Combining Multiple Classifiers and Their Applications to Handwriting Recognition, *1992 IEEE, IEEE Transactions on Systems, Man, and Cybernetics*, vol. 22, No. 3, May/Jun. 1992, pp. 418-435.

H. Bischof, W. Schneider and A.J. Pinz, Multispectral Classification of Landsat-Images Using Neural Networks, *1992 IEE, IEEE Transactions of Geoscience and Remote Sensing*, vol. 30, No. 3, May 1992, pp. 482-490.

Philip D. Heermann and Nahid Khazenie, Classification of Multispectral Remote Sensing Data Using a Back-Propagation Neural Network, *1992 IEEE, IEEE Transactions on Geoscience and Remote Sensing*, vol. 30, No. 1, Jan. 1992, pp. 81-88.

Josef Kittler, Mohamad Hatef, Robert P.W. Duin and Jiri Matas, On Combining Classifiers, *1998 IEEE, IEEE Transactions on Pattern Analysis and Machine Intelligence*, vol. 20, No. 3, Mar. 1998, pp. 226-239.

* cited by examiner

Fig.2 Thirty-one facial images downloaded from the Internet (a) Four clusters of images 1 to 31 according to criterion 1 in the DCT domain, from NN1.

(b) Four clusters of images 1 to 31 according to criterion 2 in HAAR domain, from NN2.

(c) Four clusters of images 1 to 31 according to criterion 3 using SVD, from NN3.

Fig. 4. Clusters $C_1$, $C_2$ and $C_3$ of images 1 to 31 obtained from each NN

Fig. 5. Recognition of images using the STNN classifier.

Fig. 6 A Tree Structure for Recognition of N Signals, one signal identified at each stage Fig. 7 A tree structure for recognition of N signals of unknown probability of occurrence Fig. 8 The Pattern Recognition System in the Learning Mode Fig.9 The Pattern Recognition System in the Running Mode Fig. 10 Recognition of 8 images using the system Fig. 11 Eight facial images downloaded from the Internet Fig.12 Noisy facial images Fig. 13 shows a block diagram of the Evolutionary Learning Recognition

SELF-DESIGNING INTELLIGENT SIGNAL PROCESSING SYSTEM CAPABLE OF EVOLUTIONAL LEARNING FOR CLASSIFICATION/RECOGNITION OF ONE AND MULTIDIMENSIONAL SIGNALS

This invention relates to a one and multidimensional signal classification neural network system that employs a set of criteria extracted from the signal representation in different transform domains [denoted the Multicriteria Multitransform Neural Network (MCMTNN)] classifier and more particularly to the signal projection, in each appropriately selected transform domain which reveals unique signal characteristics whereby the criteria in the different domains are properly formulated and their parameters adapted to obtain classification with desirable implementation properties such as speed and accuracy and claims the benefit of U.S. Provisional Application No. 60/315,420 filed Aug. 28, 2001.

BACKGROUND AND PRIOR ART

Recently, pattern recognition has received great deal of attention in diverse engineering fields such as oil exploration, biomedical imaging, speaker identification, automated data entry, finger prints recognition, etc. Many valuable contributions have been reported in these fields [see: Chung, K, Kee, S. C. and Kim S. R, "Face recognition using principal component analysis of Gabor filter responses", Proceedings of 1999. International Workshop on Recognition, Analysis, and Tracking of Faces and Gestures in Real-time Systems, pp. 53–57; Leondes, C. T.: Image Processing and Pattern Recognition, (Academic Press, 1998); and. Luo, X. and Mirchandani, G., "An integrated framework for image classification", Proceedings of 2000 IEEE International Conference on Acoustics, Speech, and Signal Processing, Istanbul, Turkey, Vol. 1, pp. 620–623.].

Face recognition is one of the important research topics in this area which has been receiving the attention of many researchers due to its useful applications, such as system security and human-computer interface [Chellappa, R., Wilson, C. L. and Sirohey, S., "Human and machine recognition of faces", a survey. Technical Report CAR-TR-731, CS-TR33339, University of Maryland, August 1994.]

In conventional pattern recognition, the task is divided into 2 parts. The first part is obtaining a feature space of reduced dimensions and complexity, and the second part is the classification of that space [Sarlashkar, M. N., Bodruzzaman, M. and Malkani, M. J., "Feature extraction using wavelet transform for neural network based image classification", Proceedings of the Thirtieth Southeastern Symposium on System Theory, 1998, pp. 412–416.].

Neural Networks (NN) have been employed and compared to conventional classifiers for a number of classification problems. The results have shown that the accuracy of the NN approach is equivalent to, or slightly better than, other methods. Also, due to the simplicity and generality of the NN, it leads to classifiers that are more efficient [Zhou, W., "Verification of the nonparametric characteristics of back propagation neural networks for image classification", IEEE Transactions on Geoscience and Remote Sensing, March 1999, Vol. 37, No. 2 pp. 771–779]. As reported in the literature, NN classifiers possess unique characteristics, some of which are:

(i) NN classifiers are distribution free. NNs allow the target classes to be defined without consideration to their distribution in the corresponding domain of each data source [Benediksson, J. A., Swain, P. H. and Ersoy, O. K., "Neural Network approaches versus statistical methods in classification of multisource remote sensing data", IEEE Transaction on Geoscience and Remote Sensing, July 1990, Vol. 28, pp. 540–551.1]. In other words, using neural networks (NN) is a better choice when it is necessary to define heterogeneous classes that may cover extensive and irregularly formed areas in the spectral domain and may not be well described by statistical models;

(ii) NN classifiers are important free. When neural networks are used, data sources with different characteristics can be incorporated into the process of classification without knowing or specifying the weights on each data source. Until now, the importance-free of neural networks has mostly been demonstrated empirically [Bishof, H., Schneider, W. and Pinz, A. J., "Multispectral classification of LANDSAT-images using neural networks", IEEE Trans. on Geoscience and Remote Sensing, May 1992, Vol. 30, pp. 482–490.]. Efforts have also been made to establish the relationship between the importance-free characteristic of neural networks and their internal structure, particularly their weights after training [see Zhou above]. In addition, NN implementations lend themselves to reduced storage and computational requirements.

The NN learning is generally classified as supervised or unsupervised. Supervised methods have yielded higher accuracy than unsupervised ones, but suffer from the need for human interaction to determine classes and training regions. In contrast, unsupervised methods determine classes automatically, but generally show limited ability to accurately divide terrain into natural classes [Hara, Y., Atkins, R. G., Yueh, S. H., Shin, R. T., and Kong, J. A., "Application of Neural Networks to Radar Image Classification", IEEE Trans. on Geoscience and Remote Sensing, January 1994, Vol. 32, No. 1, pp. 100–109 and Herman, P. D., and Khazenie, N., "Classification of multispectral remote sensing data using a back-propagation neural network", IEEE Transactions on Geoscience and Remote Sensing, January 1992, Vol. 30, pp. 81–88.].

In the field of pattern recognition, the combination of an ensemble of neural networks has been to achieve image classification systems with higher performance in comparison with the best performance achievable employing a single neural network. This has been verified experimentally in the literature [Kittler, J., Hatef, M., Duin, R. P. W. and Matas, J., "On combining classifiers", IEEE Transaction on Pattern Anaysis and Machine Intelligence, March 1998, Vol. 20, pp. 226–239.]. Also, it has been shown that additional advantages are provided by a neural network ensemble in the context of image classification applications. For example, the combination of neural networks can be used as a "data fusion" mechanism where different NN's process data from different sources [Luo, X. and Mirchandani, G., "An integrated framework for image classification", Proceedings of 2000 IEEE International Conference on Acoustics, Speech, and Signal Processing, Istanbul, Turkey, Vol. 1, pp. 620–613.]. A number of image classification systems based on the combination of the outputs of a set of different classifiers has been. Different structures for combining classifiers can be grouped as follows [see Lu, Y. above and Ho, T. K., Hull, J. J. and Srihari, S. N., "Decision Combination in Multiple Classifier Systems", IEEE Trans. on Pattern Analysis Machine Intelligence, January 1994, Vol. 16, No. 1, pp. 66–75.]:

i—Parallel Structure;

ii—Pipeline structure; and, iii—Hierarchical structure.

For the parallel structure, the classifiers are used in parallel and their outputs are combined. In the pipeline structure, the system classifiers are connected in cascade. The hierarchical structure is a combination of the structures in i & ii above.

The combination methods in the literature are based on voting rules, statistical techniques, belief functions and other classifier fusion schemes [Xu, L., Krzyzak, A. and Suen, C. Y., "Methods for combining multiple classifiers and their applications to handwriting recognition", IEEE Trans. On Systems, Man and Cyb.22, May–June, 1992, Vol. 22, pp. 418–435., Prampero, P. S., and de Carvalho, A. C, "Recognition of Vehicles Silhouette using Combination of Classifiers", International Joint Conference on Neural Networks, (IJCNN'98), 1998, pp. 1723–172613].

Another approach to pattern recognition is shown in U.S. Pat. No. 5,175,775 to Iwaki, et al. In its disclosure a vast number of reference images are grouped into initial groups each containing a limited number of the individual reference images in the first step. Then a most associated reference image having a maximum correlation coefficient is discriminated for each of the initial groups. Next in the second step, all of the thus obtained most-associated reference images are regrouped into new groups each having similarly a limited number of reference images. The number of new groups is accordingly small than that of the initial groups. The new groups are again subjected to the correlation operation to enable next regrouping. Lastly, in the third step, the number of groups is reduced to a single final group which contains less than the limited number of the reference images. The final group is subjected to the correlation operation with respect to the object image to thereby discriminate a particular reference image exactly corresponding to the object image among the vast number of individual reference.

It is very important to reduce the complexity, reduction of computation time and increase the fidelity of systems for pattern recognition.

SUMMARY OF THE INVENTION

It is a primary objective of the present invention to design a high fidelity pattern recognizer.

Another object of this invention is to provide a recognition algorithm that continuously enhances itself using all the information available up to that point.

A further object of this invention is to provide an evolutionary learning environment employing a recognition algorithm.

Preferred embodiments of the invention include self-designing intelligent signal processing system comprising: means for receiving signals; and, adaptive means for recognizing a pattern from the received signals, wherein the adaptive means are constantly updated over time based on the receiving signals and the method of carrying out said system comprising the steps of: receiving signals from a source; recognizing a pattern from the received signals; and adaptively updating the recognizing step with the received signals to enhance the signal processing method over time.

DESCRIPTION OF THE PREFERRED EMBODIMENTS

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

Figure 14:
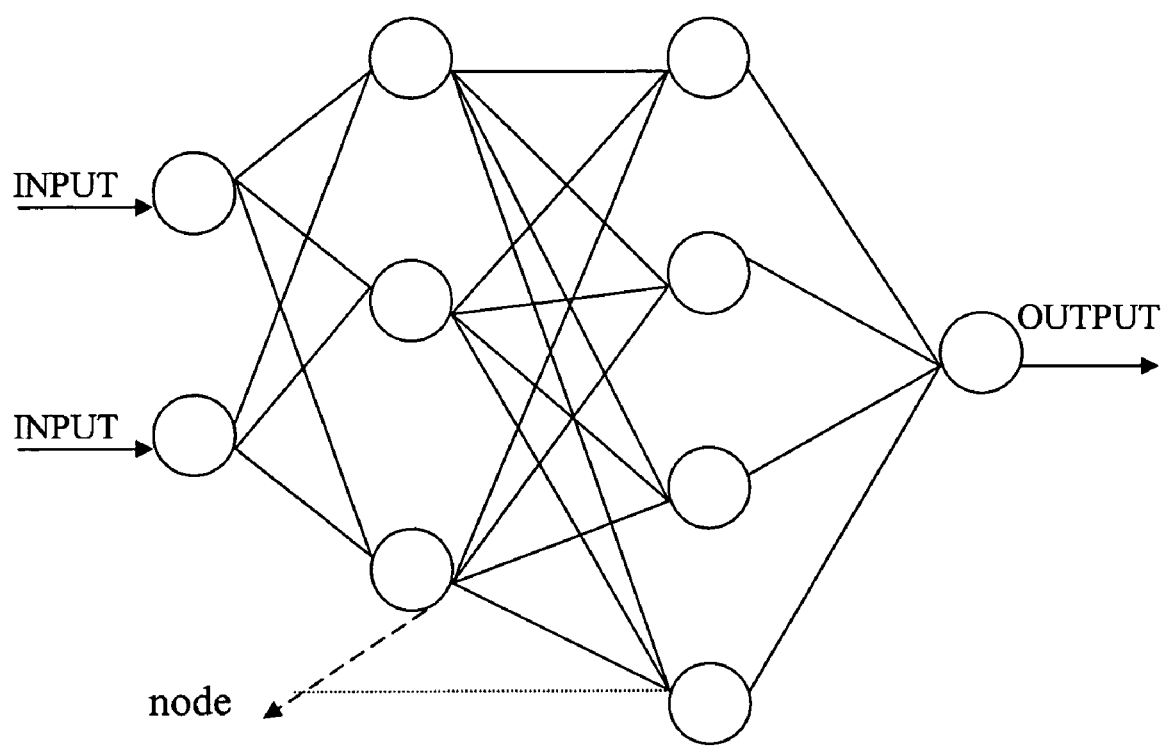
FIG. 14 shows an example of the neural network according to the present invention.

It would be useful to discuss the meanings of some words used herein and their applications before discussing the novel self-designing intelligent signal processing system capable of evolutional learning for classification/recognition of one and multidimensional signals including:

transform domain—mapping of data in order to extract more information from the input data by multiplying the signals by a certain mathematical formula and in order to retrieve the signal the resultant transformed signal, i.e., product, is multiplied by the inverse of this formula; These transform domains are similar to ones used in U.S. Pat. No. 6,437, 792 which is incorporated herein by reference thereto;

criterion—a method of computing some features of the signal from the available information about the signal; which features are similar to ones used in U.S. Pat. No. 5,940,815 which is incorporated herein by reference thereto;

In Neural network (NN)—some nodes are connected by links with an input and an output as shown in FIG. 14. The NN can be trained such that it gives a specific output when a particular input is introduced to it. The use of NN is similar to that used in U.S. Pat. No. 6,301,385 which is incorporated herein by reference thereto. FIG. 14 shows an example of the neural network which could have different number of nodes, different numbers of inputs and different numbers of output.

Back propogation—A learning algorithm that is used to train the neural network to obtain a particular output when a certain input is introduced to the neural network which training is similar to that system used in U.S. Pat. No. 6,418,378 which is incorporated herein by reference hereto;

cluster—group which is similar to the ones used in U.S. Pat. Nos. 6,336,108 and 6,337,980 which are incorporated herein by reference thereto;

cluster index—group number which is similar to the ones used in U.S. Pat. No. 5,598,507 which is incorporated herein by reference thereto;

Discrete Cosine Transform (DCT), HAAR Transform (HAAR) and Singular Values Decomposition Transform (SV)—various types of known transforms with each one having a particular mathematical formula. When one multiplies the signals by each of these formulas certain features can be easily extracted from the signals. Each one of them has its own advantages, disadvantages and problems to be used in. As discussed in the transfer domain, the multiplication of the transformed signal by the inverse of the transform generates the original signal again. The (DCT) is similar to the ones used in U.S. Pat. No. 4,791,598, U.S. Pat. Nos. 4,837,724 and 5,539,836 which are incorporated herein by reference thereto. The (HAAR) is similar to the one used in U.S. Pat. No. 4,224,678 which is incorporated herein by reference thereto. The (SV).is similar to the one used in U.S. Pat. No. 5,010,504 which is incorporated herein by reference thereto;

Single Transform Neural Network (STNN)— a single transform neural network converts the information resulting from transforming the signals into one transform domain into an input to the neural network which STNN is similar to that used in U.S. Pat. No. 6,437,743 which is incorporated herein by reference thereto;

neuron—a node in neural network wherein the nodes are connected together by links from the input to the output wherein NN are utilized in evolutionary learning and their use is similar to that used in U.S. Pat. No. 5,619,617 which is incorporated herein by reference thereto; and, AND operation—a logic operation represented by ones and zeros, i.e., 1 AND 1 gives 1, 1 AND 0 gives 0, 0 AND 0 gives zero, in other words, in order to achieve a certain goal all parts should be accomplished (check several facts and all of them come out to be true).

According to this invention, the above objects are achieved by an evolutionary recognition classifier. The advantages and features of this inventive pattern recognition technique are realized by a design which has evolutionary learning by developing the features and selecting the criteria that are best suited for the recognition problem under consideration. The evolutionary learning is similar to one used in U.S. Pat. No. 6,263,325 B1 which is incorporated herein by reference thereto. This technique is capable of recognizing an enormously large number of patterns by virtue of the fact that it basically analyzes the signal in different domains and explores the distinguishing characteristics in each of these domains. In other words, this approach uses available information and extracts more characteristics for classification purposes by projecting the signal in different domains. A large number of classification criteria can be developed to greatly enhance the performance of the classifier by exploiting: (a) Structure type; and, (b) Criteria selection and formulation from the information in the different domains.

In the following section (Section 2), a particular structure illustrates the inventive technique, namely, a parallel implementation approach using the novel Multicriteria Multitransform Neural Network (MCMTNN) classifier for image classification. Then in (Section 3) the experimental results of the parallel MCMTNN classifier is compared with the implementation and experimental results employing a Single Transform Neural Network (STNN) classifier. This comparison between the MCMTNN and the STNN classifiers confirms the improved performance of the classifier of the invention. Also, in (Section 3) experimental results are given demonstrating the improved classification/recognition performance, in the presence of additive noise, of the inventive MCMTNN classifier. Finally, conclusions are presented in (Section 4).

Section 2. Multicriteria Multitransform Neural Network (MCMT): A Parallel Implementation In this implementation, shown in FIG. 1, the pattern recognizer extracts the features in parallel, from more than one transform domain, i.e., Domain 1 is 10, Domain 2 is 12, . . . Domain D is 14. These features are obtained from the transform coefficients representing the input signals 16 into the different Domains 10, 12, 14. Different classification criteria in each Domain 18, 20, 22 (shown as a separate box for each respective domain) are developed using the coefficients in that particular domain such as the spectral characteristics, the energy distribution in each of the different transform domains several regions, etc. First, a criterion, with adaptable parameters, is introduced to the several neural networks (NN) which are identified as NN1 is 24, NN2 is 26 and NN3 is 28. Then, by means of supervised learning, such as the respective back propagation algorithms of the several NNs, such classifies the input signals into a number of groups according to that criterion over the range of the adaptable parameters.

A potentially successful criterion i, with its selected values of the parameters, in a particular domain, clusters the N input signals in a number of distinct non-overlapping clusters. The cluster index, according to the $i^{th}$ criterion, is denoted $c_1$, where $c_1 = 1, 2, 3, \ldots, C_{1_i}$. Corresponding to a number n of selected criteria, i takes the values $1, 2, \ldots$, or n. It is worthwhile to note that more than one criterion can be derived from a given domain. Also, $C_i$ is in general, different for the different i's.

The NN Classifier learning continues, by testing all the criteria presented over the parameters range for each criterion, until a successful set of criteria is obtained. A successful classifier using n criteria, i.e. decision, should yield a unique composite index $(c_1 c_2 c_3 \ldots c_n)$ corresponding to each of the N input signals.

Also, it is easy to show that $$N \leq \prod_{i=1}^{n} C_i$$

$c_1 = 1, 2, \ldots C_1$, $c_2 = 1, 2, \ldots C_2$, $c_n = 1, 2, \ldots C_n$ $n = n_1 + n_2 + n_3 + \ldots + n_D$ where D is the number of transform domains, and $n_k$ is the number of criteria in the $k^{th}$ domain, $(k = 1, 2, \ldots D)$.

Section 3. Experimental Results

Figure 2:
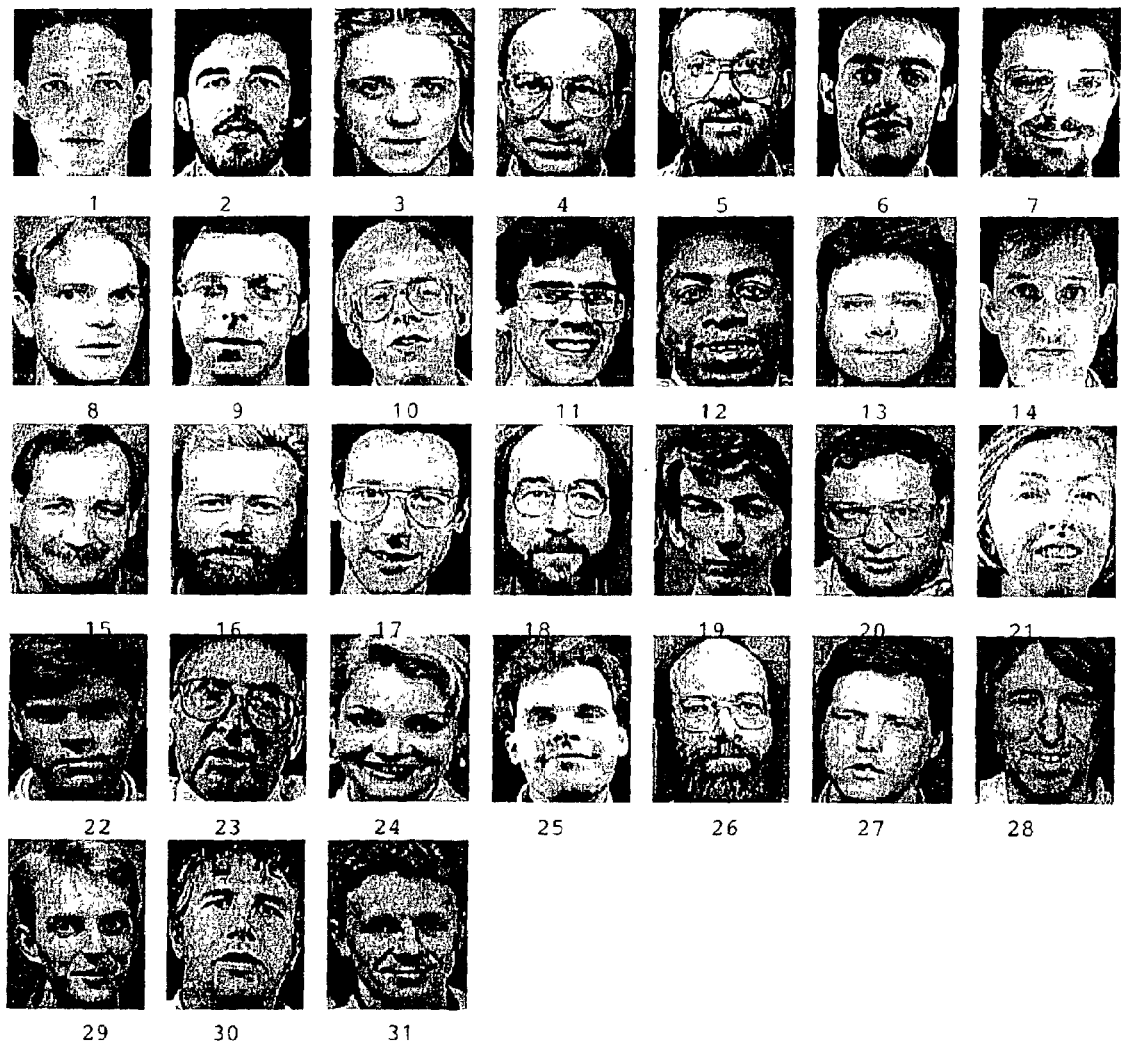
FIG. 2 shows facial images 1 through 31 downloaded from the Internet.

Sample experimental results are given to illustrate the performance of the technique. In this example, thirty-one, 8 bit gray level, facial images are downloaded from the Internet as shown in FIG. 2 and identified numerically therein. These images are presented to the classifier. The results obtained using the MCMTNN technique, are presented and compared with those obtained from a NN employing a Single Transform, STNN.

3-i MCMTNN Classifier

Figure 3:
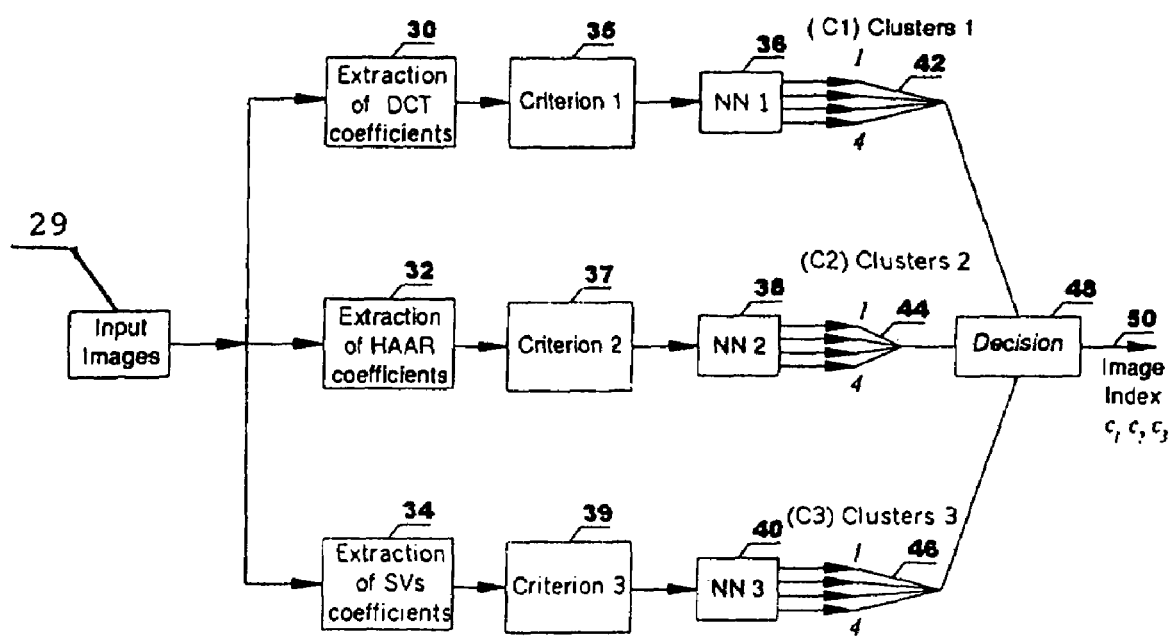
FIG. 3 shows an implementation example of the MCMTNN classifier.

A resulting successful structure is shown in FIG. 3. It uses three NN's in parallel and projects the images in three domains, namely, Discrete Cosine Transform (DCT) 30, HAAR Transform (HAAR) 32, and Singular Values Decomposition (SV) 34, as shown in FIG. 3. Each NN has one neuron in the input layer, 10 neurons in the first hidden layer, 15 neurons in the second hidden layer, and one neuron in the output layer. The first criterion 35, selected by the first NN 36, is the sum of the 4×4 spatial low frequency components in the DCT domain for each image. The second criterion 37 which is the sum of the 4×4 low sequency HAAR coefficients for each image was chosen by the second NN 38. Criterion 3 39, from the singular value decomposition (SV), resulting from the third NN learning 40, is the sum of the ten largest singular values for each image. Each NN clusters the images in four groups as shown by C1 42, C2 44 and C3 46, respectively. It is easy to obtain the image number, the Decision 48, by a simple AND operation of $c_1$, $c_2$, and $c_3$.

Figure 4:
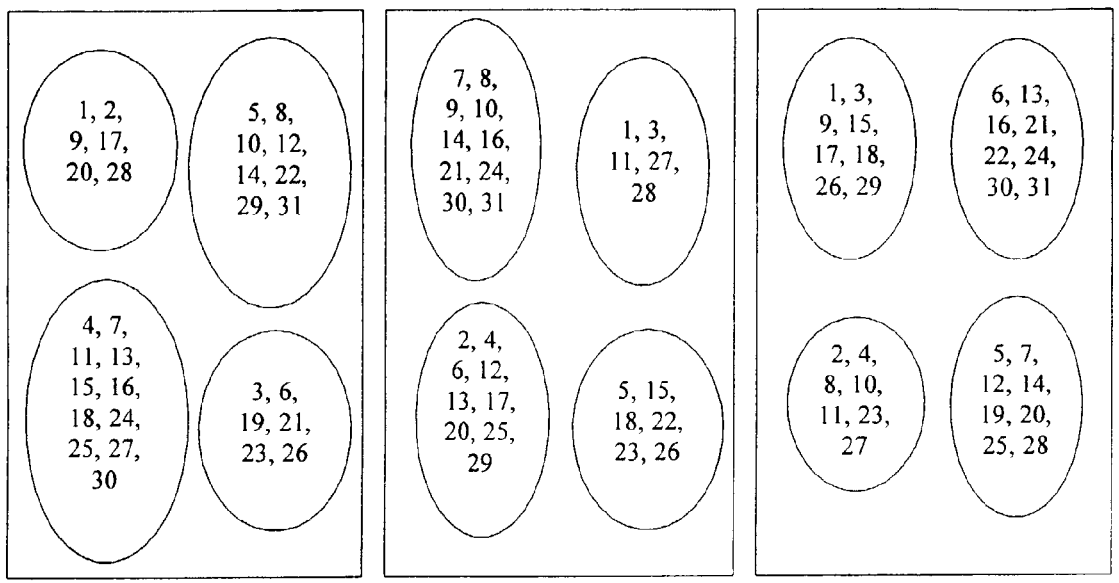
FIG. 4 shows clusters $C_1$, $C_2$ and $C_3$ of facial images 1 to 31 obtained from NN 1, NN 2 and NN 3, respectively.

Reference should now be made to FIG. 4 wherein the image results of the MCMTNN classifier is recorded. These image results shown therein for each NN clusters the images by their respective numbers in four groups, i.e, $C_i$=4 for each NN, and i=1, 2 and 3. The back propagation algorithm was used for training, yielding a mean square error (MSE) of $10^{-5}$. The MCMTNN classifier, denoted Classifier 1, successfully yields a unique composite index, $c_1c_2c_3$, for each image, as shown in FIG. 4, i.e, the classification accuracy is 100%.

The inventive technique, when presented with a given classification task, can yield more than one classifier. For example, in this experiment another classifier, denoted Classifier 2, is obtained which yields 100% classification accuracy. It uses the same structure as Classifier 1 except the third NN, where the learning results in a criterion that employs the sum of the second ten largest singular values instead of the first ten largest singular values. The performance of different classifiers can be evaluated and/or the redundancy can be used to devise a voting scheme to enhance the accuracy of classification of incomplete or corrupted data.

Alternatively, a design criterion is incorporated in the design of the classifiers such that the fused data from the different classifiers yields acceptable performance under nonideal conditions, i.e. much distortion, corrupted signals, noise, etc. An example of the non-ideal conditions is given in the following section, 3-iii.

3-ii MCMTNN Classifier of Corrupted Images

White noise up to 10 gray levels is added to each facial image shown in FIG. 2 and then presented to Classifier 1 and Classifier 2 as described in Seq 3-i. The following results are obtained as follows in 3-ii-a and 3-ii-b:

3-ii-a Classification of noisy images by Classifier 1

From the thirty-one images in FIG. 2, thirty images are clustered correctly when using the first criterion 35 (DCT), all images are clustered correctly when using the second criterion 37 (HAAR) and 26 images are clustered correctly when using the third criterion 39 (SV). By a simple "AND" operation of the outputs of the 3 NNs, 26 images out of the 31 are recognized successfully when using this classifier.

3-ii-b Classification of Noisy Images by Classifier 2:

From the input thirty-one images in FIG. 2, thirty images are clustered correctly when using the first criterion 35 (DCT), all images are clustered correctly when using the second criterion 37 (HAAR) and 24 images are clustered correctly when using the third criterion 39 (SV). By combining the outputs of the 3 NNs, 24 images out of the 31 are recognized successfully when Classifier 2 is used.

It is significant to note that Classifier 2 is designed such that the images that Classifier 1 fails to recognize are recognized successfully by Classifier 2, and vice versa, when an additional deciding appropriate criterion is introduced. This is illustrated in the following Section 3-ii-c:

3-ii-c Classification enhancement by combining Classifier 1 and Classifier 2:

By using a simple detector and another feature of the image, energy in this example, it is determined which of the two results, from classifiers 1 and 2, when they disagree, is correct. This additional voting step resulted in recognizing all of the 31 images successfully.

Figure 5:
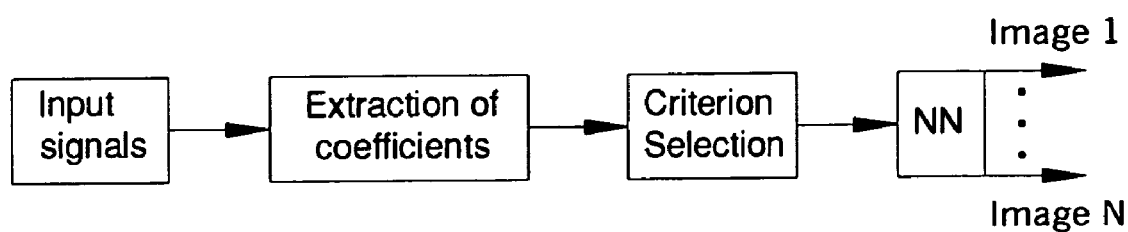
FIG. 5 is a flow chart used in the recognition of images using the STNN classifier.

3-iii Single Transform Neural Network (STNN) Classifier:

This structure uses one NN and one transform as shown in FIG. 5. The STNN classifier is trained with different criteria in different domains. The neural network that successfully classifies the images in FIG. 2 has one neuron in the input layer, 20 neurons in the first hidden layer, 30 neurons in the second hidden layer, 40 neurons in the third hidden layer, 50 neurons in the fourth hidden layer and one neuron in the output layer. A Backpropagation algorithm is used for training with MSE of $10^{-5}$. It is worthwhile to note that the number of outputs of the STNN classifier is much more than that of the approach. Thus, the time taken in training the STNN classifier is expected, and confirmed experimentally, to be more than that of the time taken to train the MCMTNN (approximately five times in this example). Then, the classifiers are tested with images corrupted with noise. The criterion in a particular domain that gives the best results is retained. After many trials, the best results obtained using one of the 3 transforms, DCT, HAAR and SVD, are as follows:

In the DCT domain, six images out of the thirty-one are recognized successfully and the criterion selected by the STNN is the sum of the 4×4 low frequency components;

In the HAAR domain, eight images out of the thirty-one are recognized successfully and the criterion selected by the STNN is the sum of the 4×4 spatial low sequency components, for each image; and;

by the use of SVD, eight images out of the thirty-one are recognized successfully when using the sum of the 4 largest Singular values for each image.

Section 4. Different structure of the proposed technique (Multi-Stage Binary Classifier)

The pattern recognition technique is capable of recognizing a large number of patterns by analyzing the projected patterns (signals) in different domains, explores the distinguishing characteristics, and formulates the corresponding criteria, in each of these domains. The optimum set of criteria is selected by the classifier to satisfy certain constraints. According to these criteria, at each node in each stage, the signals presented are binary clustered, i.e., divided into two groups, according to an appropriately selected criterion. The members of the same group are assigned an index of 0 or 1. Similarly, the signals of each group are binary clustered repeatedly. The process is continued until each signal, or group of signals, is identified by a unique composite index.

A useful structure and the corresponding classification algorithm are hereafter described. Sample experimental results to illustrate the performance of the pattern recognition system are also given. The recognition process can be considered as a special case of classification, at the classifier output, each classified group contains only one signal. In the work presented here, the classification and recognition notation are used interchangeably. Also, the patterns to be classified are treated as signals and frequently referred to as such.

A Useful Structure of MSB Classifier

In this Section, a useful multistage structure, with binary classification at each node in each stage, is described, the algorithm employed is presented and the algorithm's evolutionary learning is also shown.

As will become clear in the following sections, for unique classification of N patterns, the number of Binary Classification Units (BCU's) needed equals N−1, irrespective of the number in each subgroup after each BCU. The number of stages each pattern has to go through to be identified depends on the subgrouping strategy. Two extreme situations are given in the following sections.

Figure 6:
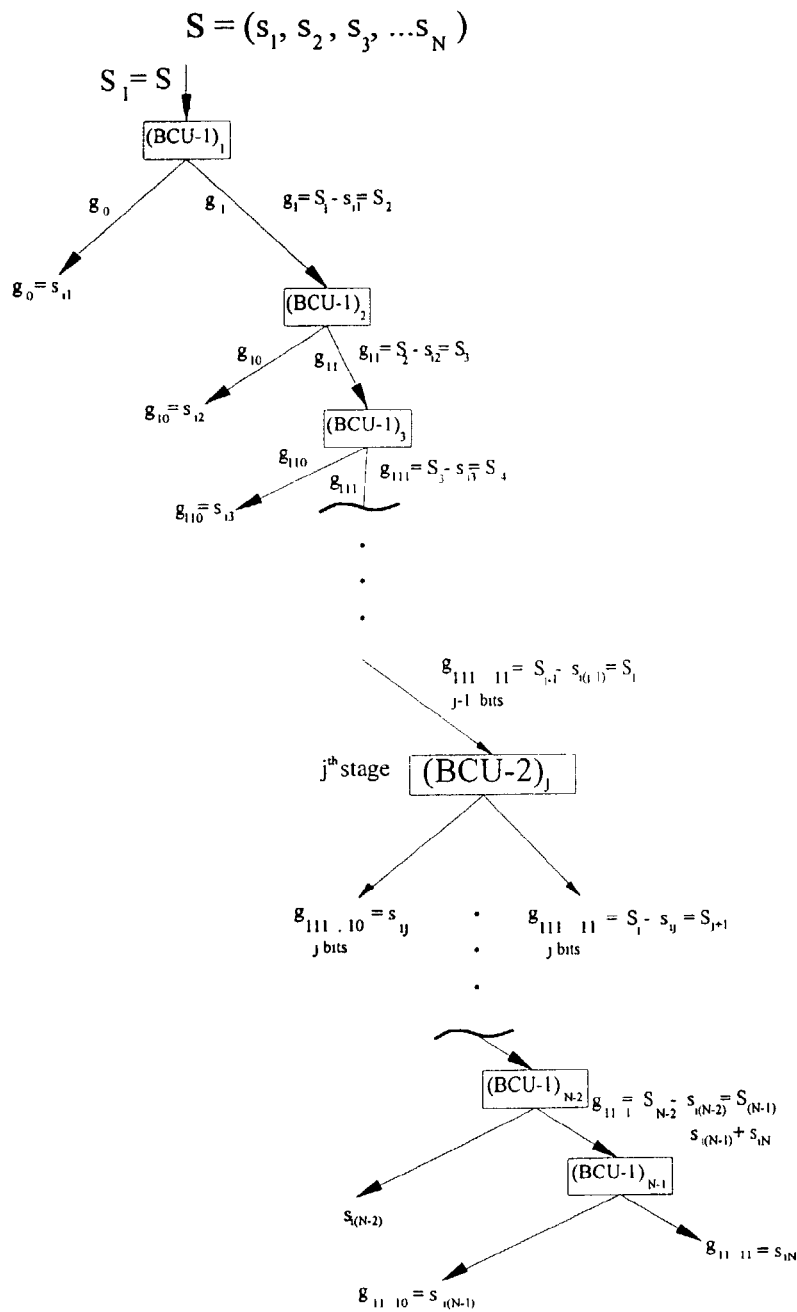
FIG. 6 shows a Tree Structure for Recognition of N Signals, one signal identified at each stage.

In FIG. 6, the pattern with the highest probability of occurrence is identified in one stage, while the pattern with the lowest probability is identified after N−1 stages. For the structure in FIG. 7, each pattern is identified after r stages, where $N=2^r$.

The optimum classification structure is selected according to the nature of the problem under consideration. The case of unknown probability of occurrence of signals is examined. The algorithm is presented. Also, simple implementation examples are given to illustrate the great performance of this technique.

A. The Binary Classifier Unit (BCU)

Figure 7:
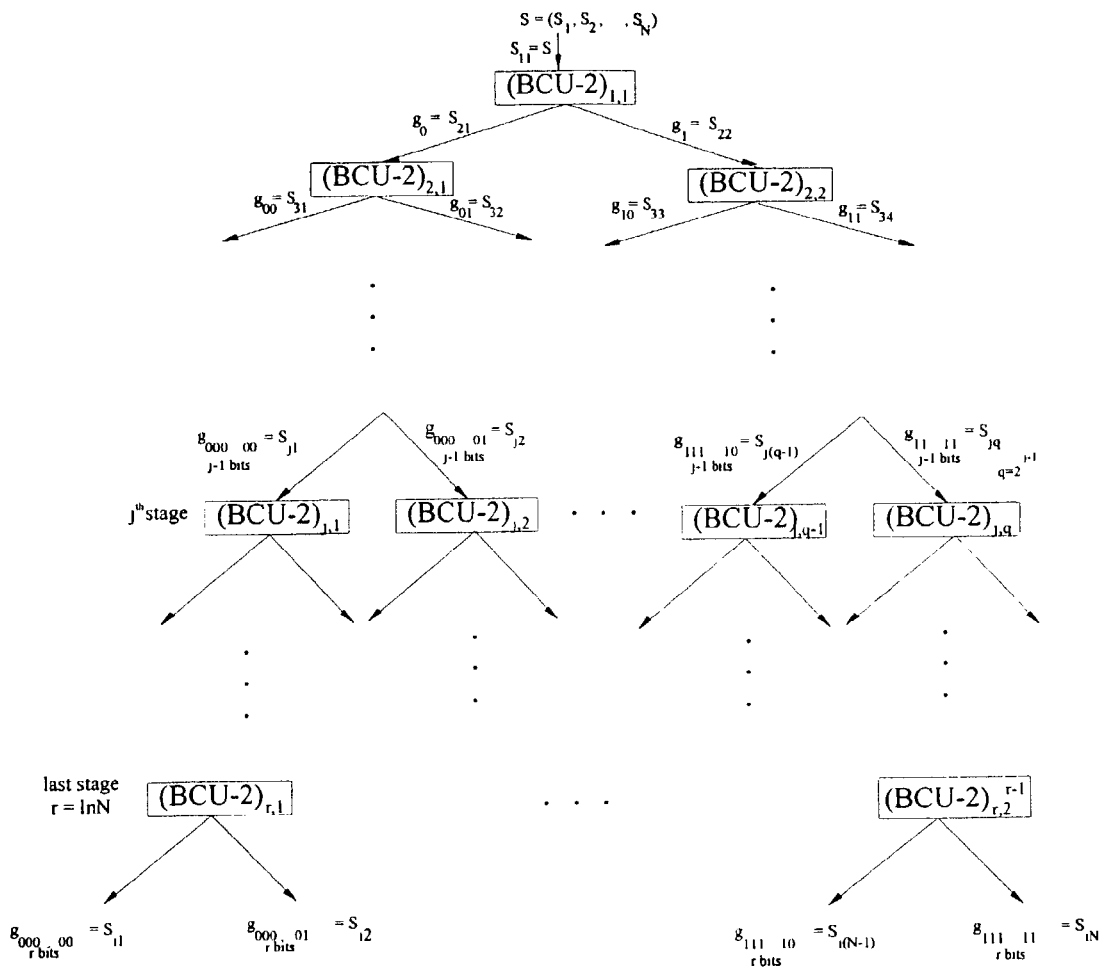
FIG. 7 shows a Tree structure for recognition of N signals of unknown probability of occurrence.

At each node, two possible BCU designs are described. The first design, BCU-1 of FIG. 6, is used when apriori information regarding the probability of occurrence of each signal, with one of them being dominant, in the group of signals presented to the BCU, is available. The second design, BCU-2 of FIG. 7, is used when either no probability information is available or all the signals in the group presented to the BCU are almost equally probable. As mentioned above, the second design is employed in the MSB classifier. The first design is given for the sake of completeness.

1) BCU-1:

In the structure shown in FIG. 6, there is only one node and one BCU at each stage. One of the signals, $s_{iJ}$, in the group of signals presented to BCU-1 at the $j^{th}$ stage, say $(BCU-1)_J$, is dominant, i.e, has the highest probability in this group. $(BCU-1)_J$ employs criterion $C_J$ to group the input set of signals, $S_J$, to $(BCU-1)_J$ in two groups. One group $g_{wJ}$ contains the dominant signal only, $s_{iJ}$, where $s_{iJ}$ is the signal uniquely identified by $(BCU-1)_J$, at the $j^{th}$ stage while the second group, $g_{w(j+1)}$, contains the remaining signals in the input group $S_J$, thus $g_{wJ}=S_{1j}$ $g_{w(j+1)}+S_j-S_{1J}=S_{J+1}$ where the subscript $w_J$ and $w_{J+1}$ are binary words equal to j and j+1, respectively, Referring to the multistage structure in FIG. 6, the set S of N signals, $s_1, s_2, s_3, \ldots s_N$, is to be classified where $S=(s_1, s_2, s_3, \ldots, s_N)$. The probability of occurrence associated with the patterns are $P_{S_{i1}}, P_{S_{i2}}, \ldots P_{S_{iN}}$ such that $P_{S_{i1}} > P_{S_{i2}} > \ldots > P_{S_{iN}}$ The N signals are extracted in a descending order of their probability. Thus, a signal with higher probability is classified with fewer classification stages compared with a signal with lower probability. This, in general, is expected to lead to an overall reduction in the average time and amount of computations required for recognition.

2) BCU-2:

The BCU used at each node, BCU-2, groups the input patterns in two groups, each containing the same number of patterns. The corresponding structure is shown in FIG. 7. At the $j^{th}$ stage, there are q nodes where $q=2^{J-1}$. The number of stages required to uniquely identify each of the $N=2^r$ input patterns is r. The total number of (BCU-2)'s equals N−1. At the $k^{th}$ node, (k=1, 2, . . . , q), in the $j^{th}$ stage, $(BCU-2)_{jk}$ employs criterion $C_{jk}$ to group its input set of patterns, $S_{jk}$, into two groups, $g_{w_0}$, and $g_{w_1}$, where $w_o$ and $w_1$ are j bit binary words equal to 2k−2 and 2k−1, respectively.

B. MSB Structure and Algorithm

The structure is shown in FIG. 7. The system operates in two modes, namely, the learning (training) mode, and the running mode.

Figure 8:
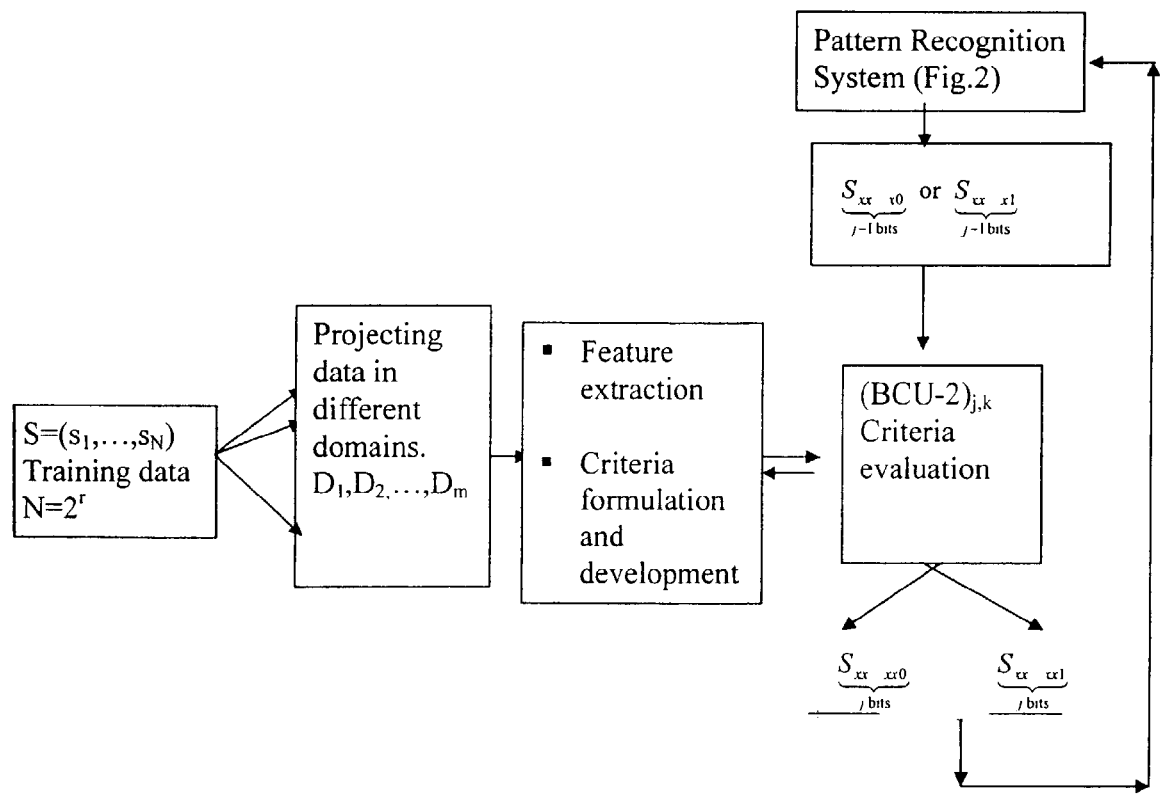
FIG. 8 shows the Pattern Recognition System in the Learning Mode.

1. The MSB system in the Learning Mode:

Referring to FIG. 8, the algorithm, in the learning mode, is summarized as follows: The training signals are projected and analyzed in different domains. Distinguishing characteristics are extracted in each of these domains; Corresponding to each feature, a criterion is developed that computes a quantitative measure of the feature parameters; and, For each $(BCU-2)_{j,k}$ in FIG. 7, starting from J=1 and progressing towards the output, different criteria are evaluated. A successful criterion $C_{jk}$ is selected and its parameters are adapted for optimal performance. The quantitative measure using $C_{jk}$ divides the input signals set $S_{jk}$ to $(BCU-2)_{jk}$ into two subgroups, $g_{xxx\ x0}$ and $g_{xxx\ \ldots\ x1}$, each containing (almost) the same number of elements. A signal in the input group $S_{jk}$ belongs to subgroup $g_{xxx\ldots x0}$ if the signal falls in a certain range, say $r_o$, and belongs to subgroup $g_{xxx\ x1}$ if it is in the range $r_1$. The distance from $r_o$ to $r_1$ is a guard range corresponding to unsuccessful classification. It is worthwhile to note that to enhance the system's reliability particularly under nonideal conditions such as noisy or corrupt data, several (BCU-2)'s each operating with its appropriately selected criterion, are used in a voting scheme to replace a critical $(BCU-2)_{jk}$. The prespecified optimality constraints for adapting/ selecting a criterion $C_{jk}$ include computational complexity, distance between the subgroups (guard range), classification accuracy with noisy/distorted data, etc. The steps above are followed until each member of the N input patterns in case of recognition (N district groups in case of classification) is uniquely classified, FIG. 7, by the r bits binary word subscript of $g_{xxx\ x}$ at the output stage.

The MSB System in the Running Mode.

Figure 9:
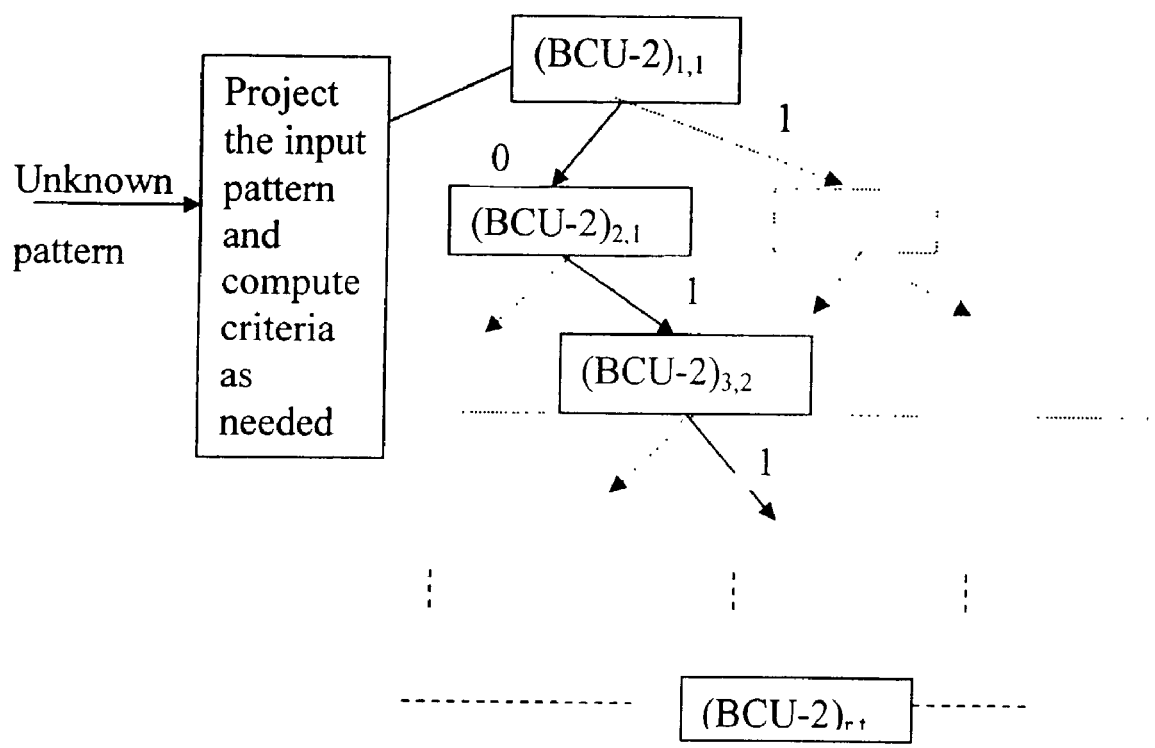
FIG. 9 shows the Pattern Recognition System in the Running Mode.

Referring to FIG. 9, the steps can be described as follows:

The unknown pattern $P_u$ is projected into the appropriately selected domains in the training mode;

According to the path $P_u$ takes in FIG. 7, say it reaches the input of $(BCU-2)_{jk}$, the appropriate criterion $C_{jk}$ is computed, and the correct group (path) $g_{xxx\ xo}$ or $g_{xxx\ x1}$ is identified;

The process is repeated for j=1, 2, . . . , r where the unknown pattern is recognized by the r bits binary word subscript of $g_{xx\ x}$; and, Corresponding to the figure, the example shown for unknown pattern in group g $$\underbrace{0\ 1\ 1\ \ldots}_{r\ \text{bits}}$$

I. Implementation Examples

Two simple examples are given to illustrate the performance of the technique. The results obtained using the MSB technique in case of noisy or corrupted data are compared to those obtained using Single Transform Neural Network, STNN, as well as Multi-Input Neural Networks.

A. First Example

Figure 10:
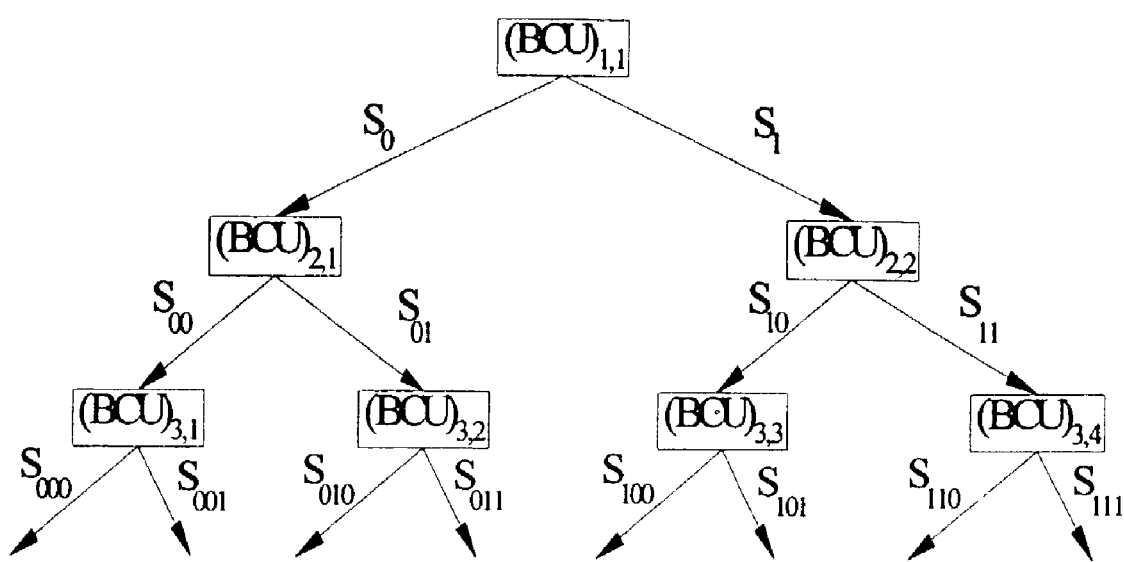
FIG. 10 shows the recognition of 8 images using the inventive system.
Figure 11:
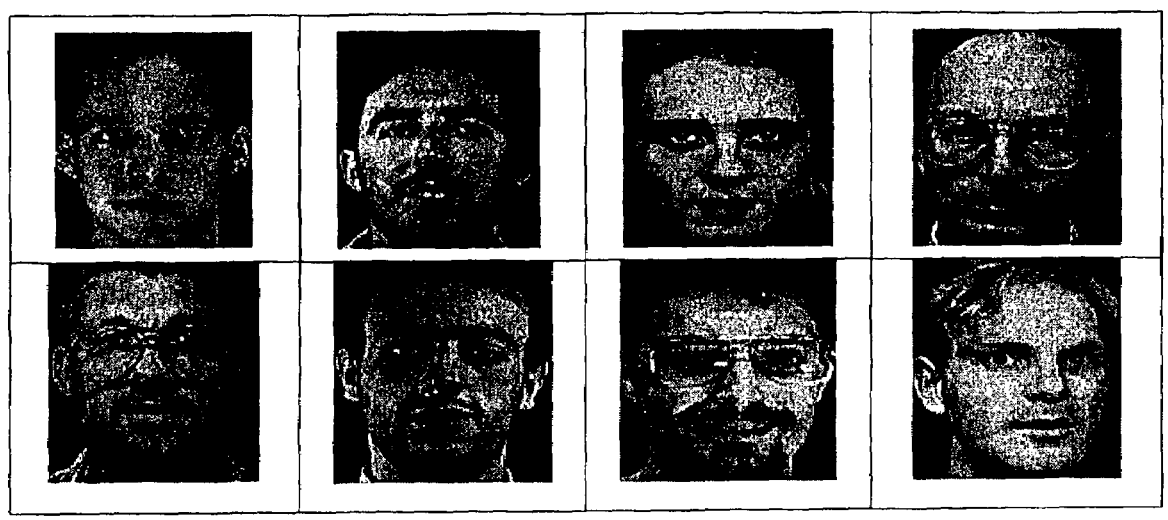
FIG. 11 shows eight facial images downloaded from the Internet.

In this example, eight, 8 bit gray level, facial images are downloaded from the Internet (Olevitti Research Laboratory ORL), as shown in FIG. 10. Up to 80 gray level additive noise was introduced to the 8 images resulting in those shown in FIG. 11.

Figure 12:
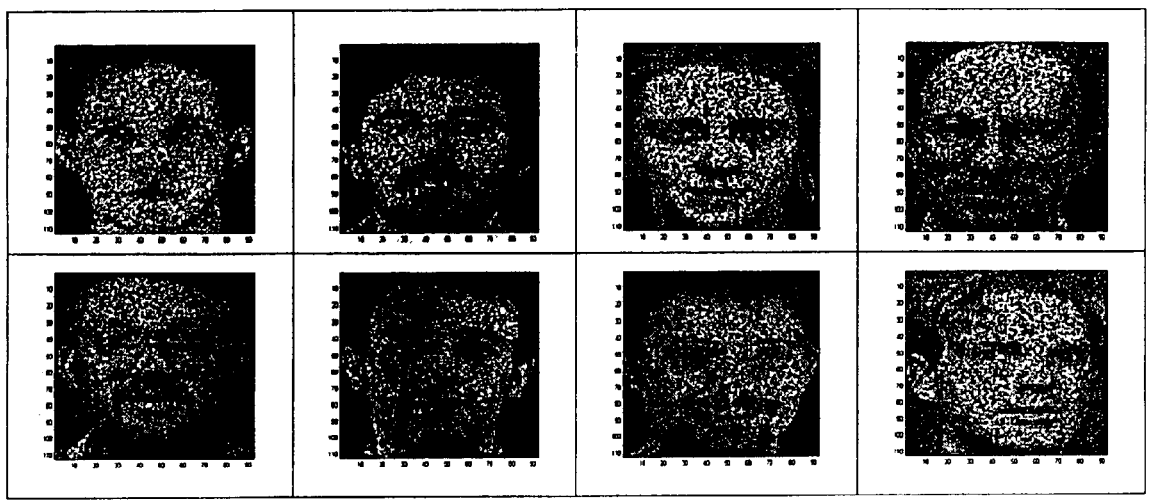
FIG. 12 shows noisy facial images.

1. Results using the MSB Classifier:

The technique is employed for the images of FIG. 12. The results obtained are summarized as follows in that each of the input images were uniquely recognized using 4 criteria and the total number of criteria used to recognize the 8 input images equaled 7. The following criteria have been employed by the BCU's used in this example:

the summation of the largest 10 singular values representing each input image, sum of the 3×3 spatial low frequency components in the DCT domain for each image, the sum of the 3×3 low sequency HAAR coefficients and the ratio between the maximum gray level and the mean value of each image;

there is a unique one to one correspondence between the identified patterns $s_{i1}$ to $s_{i8}$ and the input patterns $s_1$ to $s_8$ in the input set S; and, all 8 images were recognized successfully.

2. Results using Single Transform Neural Network Classifier.

This structure uses one NN and one transform as in FIG. 5. The STNN classifier is trained with different criteria developed from different transform domains. The neural network of FIG. 5 which successfully recognized the images, has one neuron in the input layer, 10 neurons in the first hidden layer, 15 neurons in the second hidden layer and one neuron in the output layer. A Backpropagation algorithm with different MSE ($10^{-1}$, $10^{-3}$, $10^{-5}$) is used in training the neural network. The classifier is tested with images corrupted with up to 80 gray level additive noise. The best results are obtained when the sum of the 3×3 spatial low frequency components in the DCT domain for each image is introduced to the input of the neural network. 3 images out of 8 images were recognized correctly.

3. Multi-Input Neural Network classifier.

A Multi-Input Neural Network has been trained to recognize the 8 facial images. Different combinations of 3 criteria have been used in training the Multi-Input Neural Network with different mean square error (MSE). In the best result obtained, 4 images out of 8 images were recognized correctly.

Figure 1:
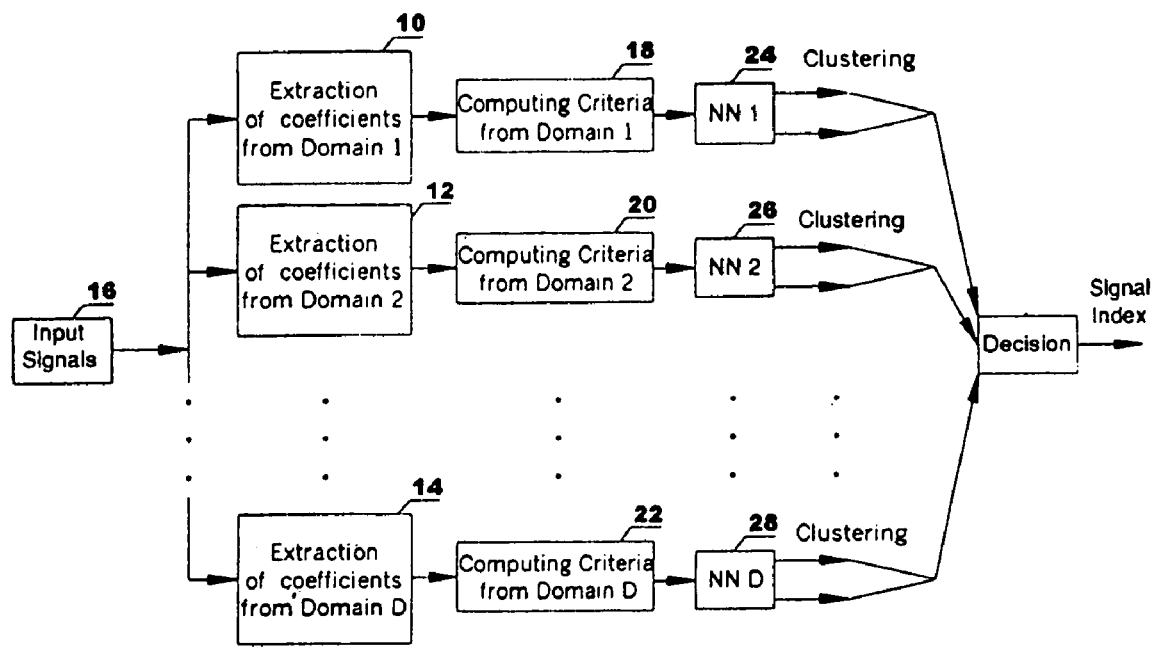
FIG. 1 is a parallel implementation of the MCMTNN classification technique.

In order to facilitate a better understanding of the invention, it is useful to discuss the relation between: FIG. 1 and FIG. 8 as seen hereafter:

| FIG. 1 | FIG. 8 |
|---|---|
| Input signals (16) | Training data $(s_1, s_2, \ldots s_N)$ |
| Extraction of coefficients from Domain 1, 2, ... D (10, 12, 14) | Projecting data in different domains |
| Computing criteria (18, 20, 22) | Feature extraction and criteria formulations |
| Clustering by means of Neural Networks (24, 26, 28) | FIG. 6 and FIG. 7 |

There are different techniques that could be used in clustering. The signals could be grouped into 4 groups as shown in FIG. 3. Alternatively, the signals could be grouped into 2 groups as in FIGS. 6 and 7. Neural Networks could be used in grouping signals as in FIGS. 1 and 3 or any other technique in grouping the signals could be used as in FIGS. 6 and 7. FIG. 1 shows that D criteria is used in order to identify any signal, FIG. 8 shows that in training mode the criteria is evaluated at each stage in order to select the optimum criteria that give the highest classification accuracy. The in FIG. 9 these criteria selected are used in order to identify any incoming signal.

FIG. 10 represents the clustering process in case of the given facial example.

PREFERRED EXAMPLE

In order to fully understand the invention described herein, it would be useful to describe the best mode of carrying it out by referring again to FIG. 3 which shows an implementation example of the MCMTNN classifier.

In the implementation of FIG. 3, one must recognize the following parameters which include a Matlab software package which has been used in digital programming of the invention. There are different ways to classify signals. For example, one inherently classifies facial images based on their eyes, hair, type of face, race, etc. which has been used in the algorithms employed in classifier of the invention. The teachings of this application introduces herein an example of the features that could be used in classifying the signals. These features are extracted from the transform domains into which the signals are projected; as is seen the DCT, HAAR and SVD transform domains have been used. They were used because it is shown in literature that these transforms can compact most of the information about the signal in small number of coefficients. From these coefficients, one can compute different criteria which are introduced to the input of neural networks in order to classify any input signal to the appropriate group.

Referring specifically to FIG. 3, the input images are downloaded from the internet in bitmap format at input 29. These digitized images are transformed to different domains.

In the first branch of FIG. 3 they are mapped into the DCT domain 30 where the requisite images are extracted by multiplication by the mathematical formula $$g_{ij} = \begin{cases} \dfrac{1}{\sqrt{N}}, & i = 0, \quad 0 \le j \le N-1 \\[2ex] \sqrt{\dfrac{2}{N}} \cos\left[\dfrac{\pi(2j+1)i}{2N}\right], & 1 \le i \le N-1, \quad 0 \le j \le N-1 \end{cases}$$

For 2-D (2 dimensions):

The transformation matrix $Y=GXG^T$

The result is a certain matrix, which represents the specified image in the DCT. This matrix has low frequency coefficients and the high frequency coefficients and some frequencies in between. The criterion 35 used in this system is the sum of the 4×4 spatial low frequency components in the DCT domain 30 for each image. Each image will be represented by a certain component according to the DCT. The component representing each image will be introduced to the neural network 36. The neural network 36 will group the 31 images into 4 groups according to the values of these components. Each image will have a group number as shown in FIG. 4.

In the second branch of FIG. 3 they are mapped into the HAAR domain 32 where the requisite images are extracted by multiplication by the mathematical formula The 1-D Haar transform is most easily expressed in matrix notation. If one lets the elements of G equal Where $r=[\log_2 i]$ and $m=i-2^r+1$, $0 \leq i \leq N-1$ $$g_{0j} = \frac{1}{N}, \quad 0 \leq j \leq N-1$$

$$g_{ij} = \frac{1}{\sqrt{N}} \begin{cases} 2^{r/2}, & \frac{m-1}{2^r} \leq \frac{j}{N} \leq \frac{m-1/2}{2^r} \\ -2^{r/2}, & \frac{m-1/2}{2^r} \leq \frac{j}{N} \leq \frac{m}{2^r} \\ 0, & \text{otherwise} \end{cases}$$

For two dimensions signal

The transformation matrix $Y=GXG^T$

The second criterion 37 is the sum of the 4×4 low sequency HAAR coefficients for each image. The second NN 38 will also group images into 4 groups.

In the third branch of FIG. 3 SVD technique has been used 34. Criterion 3 39, resulting from the SVD 34 is concerned with the sum of the ten largest singular values for each image. The output from Criterion 39 passes into NN 40 groups the images into 4 groups.

The result is that each of the digitized images has three 3 group numbers resulting from the groupings by NN 36, NN 38 and NN 40. The result is that the clusters C1, C2 and C3 of FIG. 4 relate directly to the clusters 42, 44 and 46 of FIG. 3 and FIG. 4 is the total output represented by 48 and 50.

Each image is represented by a composite index representing the group number to which it belongs to with respect to each criterion. This is a unique index for each image. It differs from one image to the other. The final result has been represented by a simple example. These results come out from the learning as different criteria have tried for this problem and the criteria that give the best result in case of noisy images have been selected.

It is a feature of this invention that its advantage is in the evolutionary learning that the value of the invention is realized. Refer now to FIG. 8 which with block diagrams indicate the pattern recognition system in the learning mode which provides the full benefits of the invention. FIG. 8 illustrates the evolutionary learning system of the Pattern Recognition System in the Learning Mode. An enormous set of criteria have been formulated and then evaluated in case of noisy or corrupted data until the optimum criteria are selected which give the highest classification accuracy.

Figure 13:
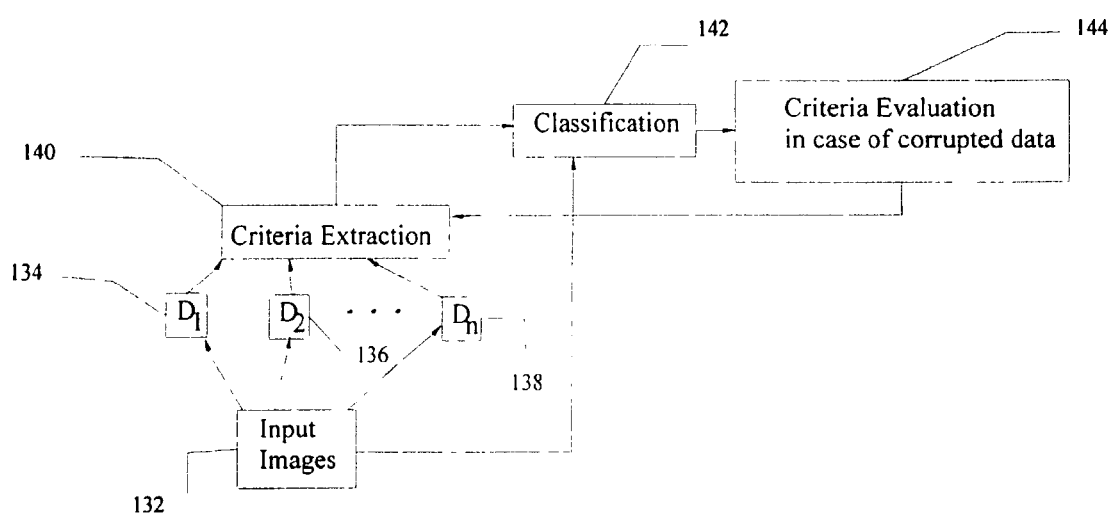
FIG. 13 shows a block diagram of the Evolutionary Learning Recognition System.

Reference should now be made to FIG. 13 which shows in a further block diagram the evolutionary learning recognition system of the invention. The training signals (input images 132) are projected and analyzed in a multiplicity of different domains indicated therein as D1 as 134, D2 as 136 and DN as 138. Distinguishing characteristics are extracted by the appropriate criteria in the block indicated as Criteria Extraction 140 in each of these domains. Corresponding to each feature, a criterion is developed that computes a quantitative measure of the feature parameters. The signals are then classified into the required set of groups based on the criteria developed in the block identified as Classification 142.

The pattern recognition system will be tested by noisy images and the selected criteria will be evaluated. In other words, the selected criteria will be tested to find out if they can still classify signals successfully when they are corrupted with noise. The Criteria Evaluation 144 is made and for those of low classification accuracy the signals will be returned for criteria extraction at 140 with other criteria.

If the criteria give high classification accuracy in case of noisy data, they will be retained. In case of non-accurate classification, other criteria will be tested until the optimum criteria are selected which give the highest classification accuracy incase of noisy signals.

SECTION 5. CONCLUSIONS

A novel MCMTNN for one and multidimensional signal classification using multicriteria processing and data fusion has been described. The multicriteria are extracted from the projections of the signals, to be classified, in multiple transform domains. The implementation example demonstrates the utility of the MCMTNN classifier for image classification. It employs NN's in parallel and three classification criteria obtained from the image projections in three transform domains. These results are compared with a traditional STNN classifier. The comparison between the MCMTNN and the STNN classifiers illustrates the improved performance of the MCMTNN classifier in terms of appreciable reduction in the overall computational complexity and increased speed.

Additional results, some of which are given in Section 3, confirm the superior performance of the MCMTNN classifier relative to the STNN approach for image classification in the presence of additive noise. Since the inventive MCMTNN classifier is capable of evolutionary learning by selecting the criteria as well as optimizing each criterion for best overall performance, it yields enhanced performance and classification accuracy for different classification environments such as noisy and incomplete data.

Another structure was discussed in Section 4. A Multi-Stage Binary pattern classification/recognition system (MSB) is presented to classify N patterns (or groups), where $N=2^r$. Two cases are presented. In the first case, no apriori information regarding the statistical properties of occurrence of the patterns is available. The MSB structure used (N−1) Binary Classification units. The number of stages required to identify an unknown pattern (or group) is equal to r. In the second case, the probability of occurrence of signals differs from one signal to the other. Signals are extracted in a descending order of their probability. The system is capable of evolutional learning to extract and optimize the classification criteria employed by the Binary Classification Units.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A self-designing intelligent signal processing system, comprising:
   (a) means for receiving signals corresponding to plural images, wherein each of the plural images are not related to other ones of the plural images;
   (b) means for extracting coefficients from the received signals in more than one transform domain, wherein the coefficients correspond to the plural images;
   (c) means for determining corresponding criteria in each of the more than one transform domain using the extracted coefficients;
   (d) an adaptive learning means that determines a best characteristics and corresponding criteria to be extracted by each of the more than one transform domain in order to recognize the plural images with the least amount of processing;
   (e) means for classifying the plural images from each more than one transform domain into selected groups according to the criteria corresponding to that one of the more than one transform domain over a range of adaptable parameters; and
   (f) means for recognizing each of the plural images from the selected groups from the more than one transform domain, wherein the self-designing intelligent signal processing system is capable of recognizing a large number of different images with a high level of accuracy.

2. The self-designing intelligent signal processing system of claim 1, wherein the more than one transform domain comprises:
   a discrete cosine transform (DCT);
   HAAR transform domain; and
   a singular values (SV) decomposition transform domain which cooperate to provide an output of digitized images, wherein said DCT, HAAR and SV transforms are arranged in parallel.

3. The self-designing intelligent signal processing system of claim 1, further comprising:
   means for selecting an optimum criteria for use in classification of the plural images from noisy signals.

4. The self-designing intelligent signal processing method, comprising the steps of:
   (a) receiving signals from a source, the signals including plural unrelated images;
   (b) recognizing a pattern from the received signals using plural transforms domains to select from each one of the plural transform domains unique features and corresponding criteria;
   (c) classifying the unique features into selected groups for each of the plural transform domains based on the corresponding criteria;
   (d) determining fidelity of said selected groups; and
   (e) updating each of the selected groups from said plural transform domains by an evolutionary recognition classifier that selects a different optimum feature and corresponding criteria for use by each of the plural transforms domains, whereby the fidelity of said selected groups is constantly improved over time based on the receiving signals to recognize each of the plural unrelated images with a high level of accuracy.

5. The self-designing intelligent signal processing method of claim 4, wherein the signals include:
   one of a one-dimensional signals and a multi-dimensional signal.

6. The self-designing intelligent signal processing method of claim 4, wherein the patterns include digitized images.

7. The self-designing intelligent signal processing method of claim 4, wherein the patterns are developed by a back propagation of respective neural networks of each one of the plural transform domains.

8. The self-designing intelligent signal processing method of claim 4, wherein the patterns include noise signals.

9. The self-designing intelligent signal processing method of claim 4, further comprising the step of:
   filtering out noise from the received signals.

10. The self-designing intelligent signal processing method of claim 4, wherein the patterns are clustered into digitized groups of common facial characteristics.

11. A multi-criteria multi-transform neural network (MC-MTNN) classifier for image classification comprising:
   (a) an input device for receiving input signals having plural different digitized images;
   (b) plural transform domains in parallel for receiving the input signals from the input device, each of the plural transform domains comprising:
      a pattern recognizer for receiving the input signals and developing transform coefficients for a particular domain and extracting plural features from the transform coefficients;
      a criteria selector for selecting classification criteria from the transform coefficients for the particular domain; and
      a neural network for classifying the plural digitized images into plural groups according to the selected criteria over a range of parameters; and
   wherein the MCMTNN classifier adaptively determines the best features and criteria for use in each of the plural transform domains for the recognition problem under consideration with the least amount of processing to recognize the plural different digitized images.

* * * * *